July 22, 1924.

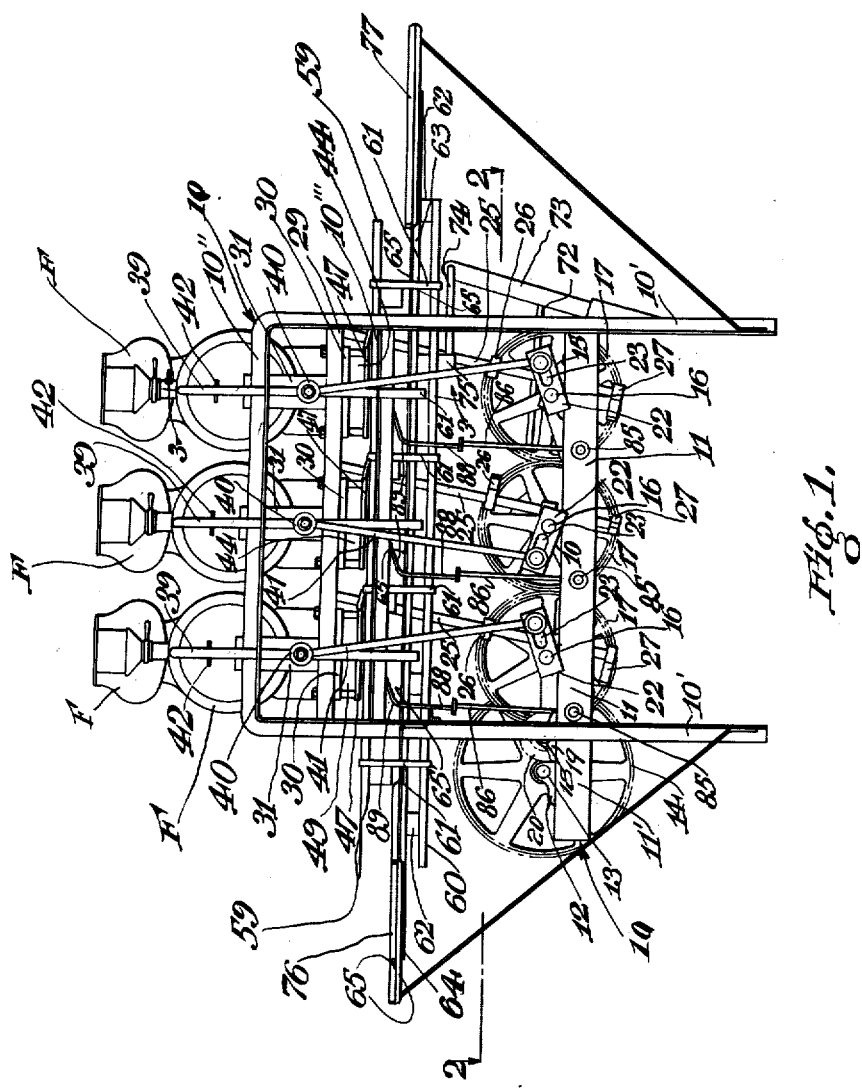

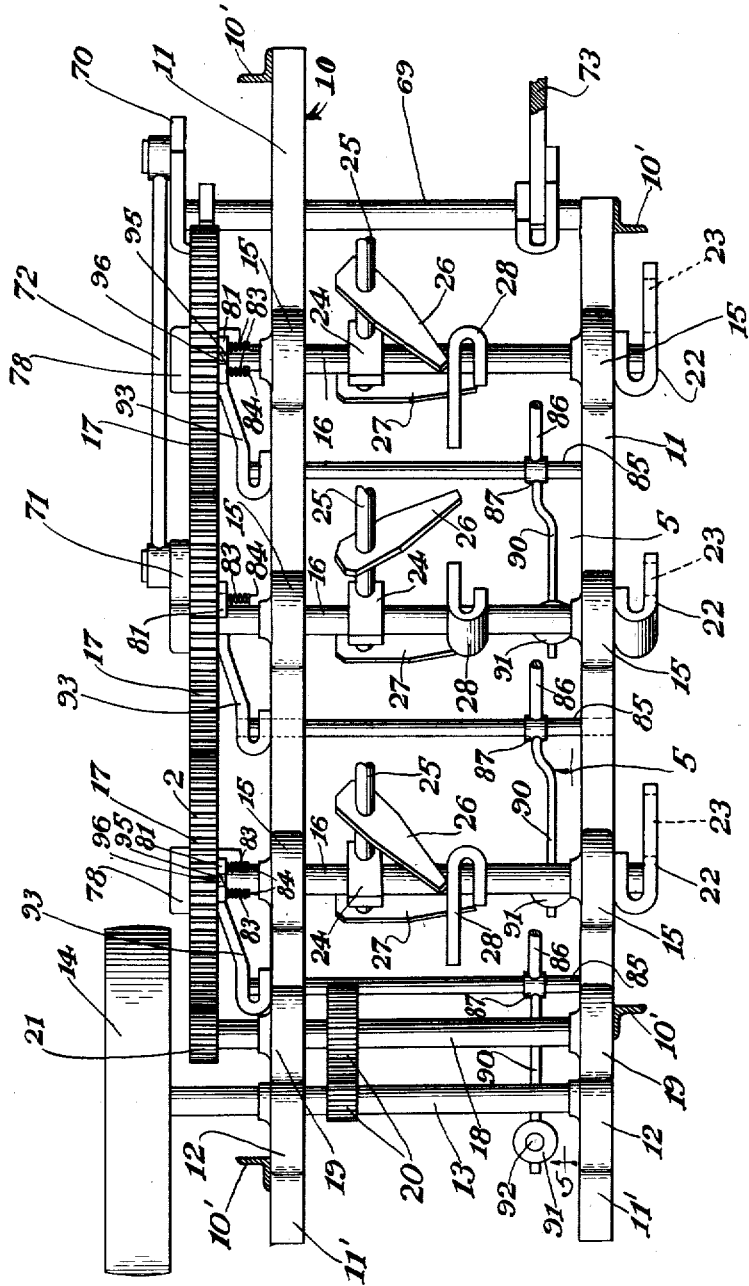

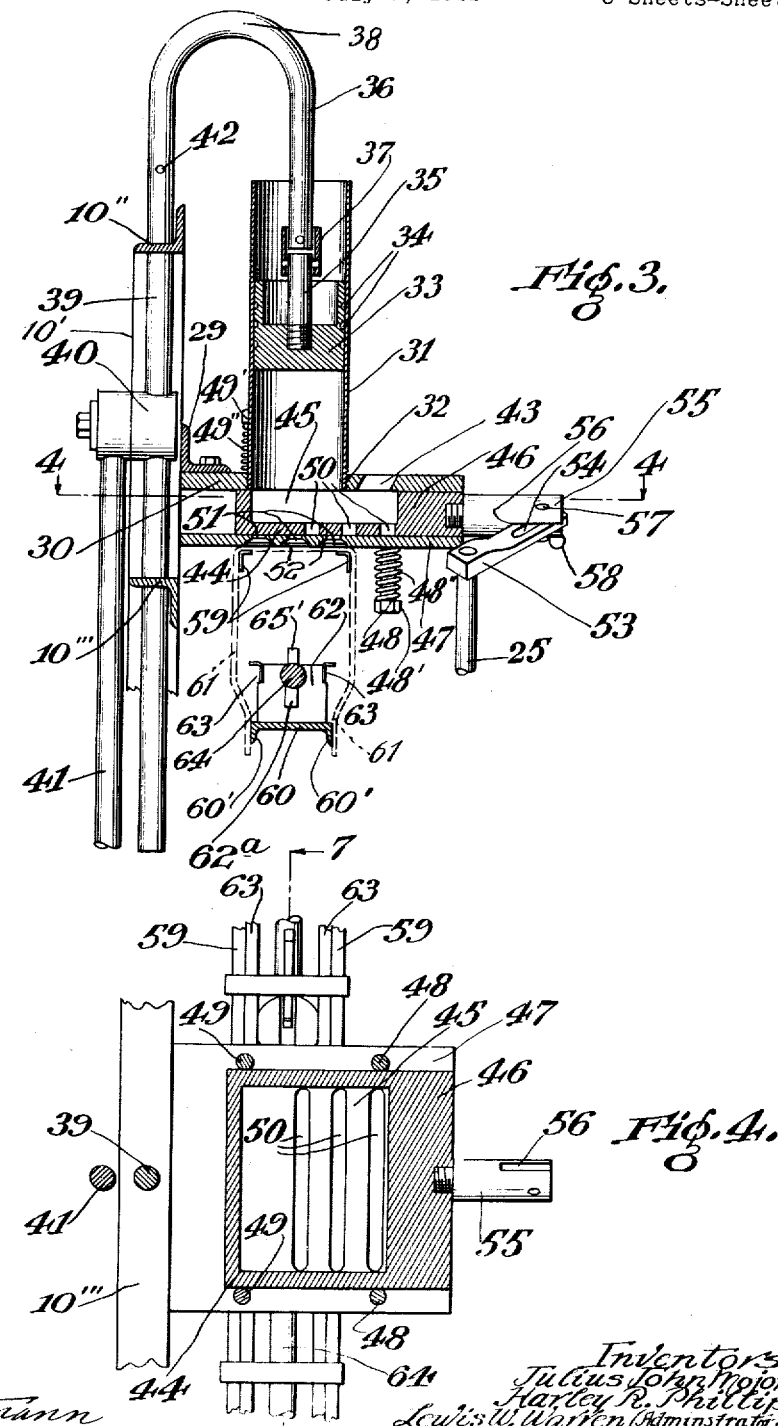

J. J. MOJONNIER ET AL

ICE CREAM BRICKING MACHINE

Filed July 3, 1922  5 Sheets-Sheet 4

1,502,110

Witness
P. J. Gathmann

Inventors:
Julius John Mojonnier
Harley R. Phillips and
Lewis W. Warren (Administrator of
Estate of Henri B. Warren, Deceased)
By
Their Attorney

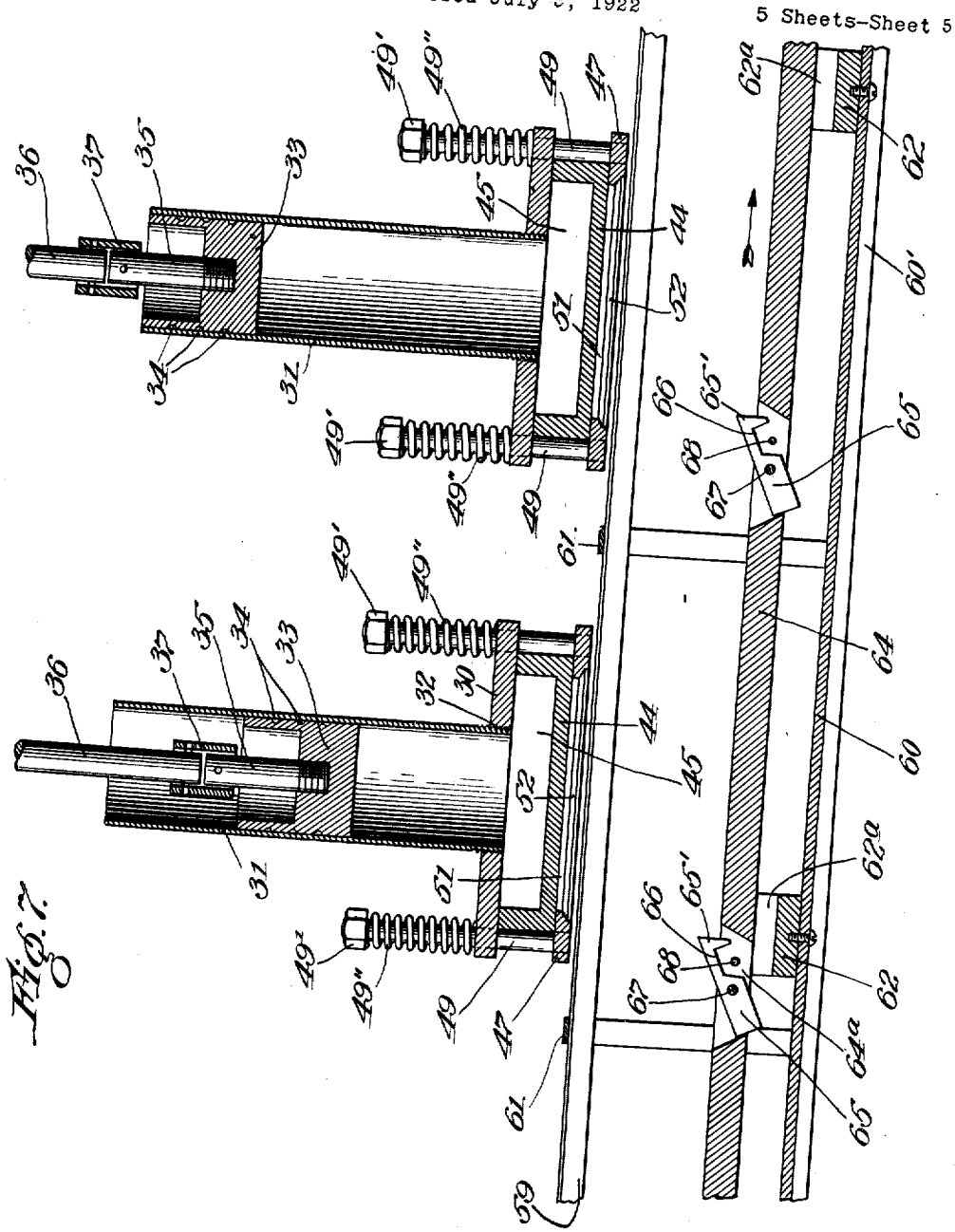

Patented July 22, 1924.

1,502,110

UNITED STATES PATENT OFFICE.

JULIUS JOHN MOJONNIER AND HARLEY RAY PHILLIPS, OF OAK PARK, AND HENRI B. WARREN, DECEASED, LATE OF OAK PARK, ILLINOIS; BY LEWIS W. WARREN, ADMINISTRATOR, OF OAK PARK, ILLINOIS, ASSIGNORS TO MOJONNIER BROS. CO., OF CHICAGO, ILLINOIS, A CORPORATION OF ILLINOIS.

ICE-CREAM-BRICKING MACHINE.

Application filed July 3, 1922. Serial No. 572,653.

*To all whom it may concern:*

Be it known that JULIUS JOHN MOJONNIER, HARLEY R. PHILLIPS, and HENRI B. WARREN, the latter deceased, LEWIS W. WARREN being the administrator of his estate, all citizens of the United States, and residents of Oak Park, in the county of Cook and State of Illinois, have invented certain new and useful Improvements in Ice-Cream-Bricking Machines, of which the following is a specification.

This invention relates to ice cream packaging machines of the type designed to fill cartons, or other containers, with ice cream in layers, either of the same or differing flavors, and has for its object the positive, governed and measured feeding and filling of the carton.

With the above and other objects in view, as will be apparent, this invention consists in the construction, combination and arrangement of parts all as hereinafter more fully described, claimed and illustrated in the accompanying drawings, wherein:—

Fig. 1 is a front elevation of a machine constructed in accordance with the present invention.

Fig. 2 is a plan section taken along line 2—2 of Fig. 1 to illustrate the driving and operating mechanisms.

Fig. 3 is a fragmentary vertical section taken along line 3—3 of Fig. 1 through one of the filling units and co-operating valve to illustrate the construction and operation thereof.

Fig. 4 is a fragmentary horizontal section taken along line 4—4 of Fig. 3 to show the construction of the slide valve and its operation.

Fig. 7 is a section taken generally along line 7—7 of Fig. 4 through two of the filling units to illustrate the carton feeding mechanism and its co-operation with the filling units.

Figure 5:
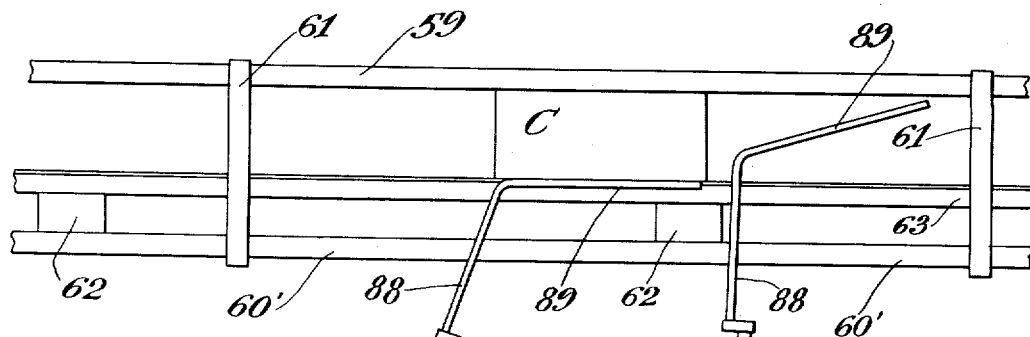
Fig. 5 is a fragmentary vertical section, with parts omitted, taken along line 5—5 of Fig. 2 to illustrate the control of the operation of the filling units from the cartons.

The present bricking machine is designed to successively fill layers of ice cream, of the same or varying colors and flavors, into a carton so that such layers will rest horizontally one above the other and while the machine is described and illustrated for operation in conjunction with a rectangular carton opening on its upper side, it is to be understood that with only immaterial and minor changes, it can be made to operate as readily effectively and efficiently with cartons of other shapes, such, for instance, as round or cylindrical, or that rectangular in form opening at the end. To accomplish this purpose, a carton carrier is provided upon which and by which the cartons are conveyed through the machine at spaced regular and predetermined intervals and by their passage, control the operation of the filling units, as will be seen. A filling unit is provided above the carton carrier for each color or layer of ice cream it is intended to place in the cartons and is connected directly to a freezer from which it receives the ice cream or to a hopper designed to receive the ice cream from the freezer prior to delivering it to the filling unit. This filling unit receives and measures a quantity of ice cream, sufficient to constitute one of the desired layers in the cartons, from the source of supply, either the freezer or hopper, and discharges it under pressure into the carton located under the unit. After this operation, the carton with one layer therein is conveyed by the carrier to the next filling unit where it receives another layer of the ice cream upon and parallel to the one already therein; and so the operation is successively repeated until the carton is filled with as many measured layers of ice cream as there are filling units on the machine. Governing means are provided in conjunction with each filling unit under the control of the cartons whereby no unit can operate unless there is a carton positioned to receive the ice cream discharged thereby.

Reference being had more particularly to the drawings, 10 designates generally the main frame of the machine, which comprises the corner uprights 10' connected at the upper ends of each side of the machine by the longitudinal horizontal pieces 10'', and carrying the horizontal co-planar bars 11 adjoining their lower ends, one bar 11 being carried by the two uprights 10' on each side of the machine in a position approximately parallel to the companion bar 11 on the opposite side of the machine. These two frame pieces, each composed of two uprights, 10' and the horizontal piece 10'', together with a bar 11 carried by the uprights 10', constitute the side portions of the supporting structure of the machine.

At one end of the machine, the bars 11 project beyond adjoining uprights 10', as at 11', and carry on or adjacent to terminals 11' the bearings 12, the bearing 12 on one bar 11 being aligned with the bearing 12 on the opposite bar 11. A drive shaft 13 is mounted in these bearings 12 and projects at one end for a considerable distance beyond the side end of the frame of the machine where it is supplied with the drive pulley 14. The entire machine is operated from this drive shaft 13 receiving its power from the pulley 14.

At regular spaced intervals throughout the length of the bars 11 and between the uprights 10' are the bearings 15 mounted on the upper faces of the bars 11 and arranged in pairs, one bearing of each pair being on one of the bars 11 and aligned with the companion bearing on the opposite bar 11. Each pair of these bearings 15 has a unit operating shaft 16 mounted therein, said shafts projecting beyond one of the bars 11 and terminating at the other bar 11. On the projecting terminals of these shafts 16 are loosely mounted the spur gears 17 aligned longitudinally of the machine one with the other and intermeshed so that all of said gears, and under certain conditions, all of the shafts 16 operate simultaneously, each deriving its power from the gear 17 of the next adjacent shaft. Arranged adjoining the drive shaft 13 is a countershaft 18 mounted in the bearings 19 carried by the bars 11 and receiving its power from the drive shaft 13 through the spur gears 20 meshed with each other, one keyed to each of the shafts 13—18. As in the case of all the shafts heretofore described, the countershaft 18 projects beyond one of the bars 11 and on its projecting end carries a spur gear 21 which meshes with the spur gear 17 of the next adjacent unit operating shaft 16. In this manner, it will be seen that the power imparted to the drive shaft 13 will be transmitted through the gears 20 to the countershaft 18 from which it is transmitted by means of the gear 21 on the countershaft 18 to the loosely mounted gears 17 on the unit operating shafts 16.

Inasmuch as the mechanisms for operating the various filling units, to be hereinafter described, are exact duplicates one of the other, a description of one of these operating mechanisms will be sufficient for the present purpose. The unit operating shaft 16, at its end opposed to the gear 17 is provided with a crank 22 with a slot 23, in the outer end thereof, said crank being provided for the purpose of imparting the force or pressure of the individual filling unit operated from the shaft 16. Intermediate of its ends and between the bars 11, the shaft 16 rotates in a fixed bearing 24 which has mounted for oscillation therein, a valve operating rod 25 angularly situated with regard to the shaft 16, and extending upwardly in the direction of the horizontal frame piece 10'' as well as projecting below the shaft 16 and the bearing 24. Keyed to this rod 25 above the shaft 16 is a trip arm 26 while a similar trip arm 27 is keyed to the rod 25 below the bearing 24 and shaft 16, said arms being tapered toward their outer terminals and occupying positions substantially at right angles to the rod 25. A dog 28 is keyed to the shaft 16 for rotation therewith so that its free end will successively contact with the tapered ends of the arms 26 and 27 for the purpose of oscillating the rod 25 in the bearing 24 first in one direction and then in the other. It will be observed from Fig. 2 that the arms 26 and 27 are not aligned with each other and hence the dog 28 contacting first with the arm 27 will oscillate the shaft 25 in one direction by virtue of the force exerted by the dog on the arm, the movement, however, being limited to the period of contact between these two elements, i. e., until the dog 28 has forced the arm 27 out of its path of movement. This movement by the rod 25 and the arm 27 brings the arm 26 into the path of movement of the dog 28 so that the continued rotation of the shaft 16 will cause this dog 28 to contact with the arm 26 and force it out of its way, thus rotating or oscillating the rod 25 in the reverse direction to the movement imparted thereto by the contact between the dog 28 and the arm 27.

Interposed between the uprights 10' on the side of the machine adjoining the cranks 22 is a horizontal supporting bar 29 positioned parallel to and adjoining the horizontal piece 10'' of the side frame. On the under side of this supporting bar 29 is a plate 30, one plate 30 being provided for each filling unit, said plates being spaced one from the other to correspond with the spacing of the operating mechanisms or shafts 16. As each filling unit and its co-operating mechanisms are like every other filling unit and its co-operating mechanisms, this description will be limited to one filling unit. A cylinder 31 is mounted on the plate 30 medially of its length and is threaded into an aperture 32 in said plate. This cylinder, with the valve to be described, constitutes the principal elements of the filling mechanism and performs the functions of measuring and forceably feeding the ice cream. The pressure imparted to the ice cream for feeding the same to the carton is created by the plunger 33 mounted for reciprocation in the cylinder 31 which is provided with the packing rings 34 whereby a relatively close fit between the cylinder and the plunger is created. A plunger rod 35 is concentrically connected to the outer face of the plunger 33 and is secured to the drive rod 36 by means of the universal joint 37 connecting the terminals of the plunger rod 35 and drive rod 36. At its outer end the drive rod 36 is rebent as at 38 forming a connecting rod 39 which rests substantially parallel to plunger rod 35 and drive rod 36. This connecting rod 39 reciprocates through an aperture in the horizontal frame piece 10″ and in a similar aperture in a second horizontal frame piece 10‴ secured between the uprights 10′ below and parallel to the upper frame piece 10″, said frame pieces 10″ and 10‴ constituting guides and bearings for the connecting rod 39. A wrist pin 40 is secured to the connecting rod 39 medially of its ends and between the frame pieces 10‴ and 10″ and pivotally connects a pitman 41 to the connecting rod 39, the pitman 41 at its lower end being adjustably connected by means of the slot 23 to the crank arm 22 of the co-operating operating shaft 16. Thus, it will be seen that as the shaft 16 rotates, the pitman 41 will cause the connecting rod 39 and the drive rod 36 to reciprocate imparting a like motion to the plunger 33 within the cylinder through the universal connection 37 between the plunger rod 35 and said drive rod. The amount of its reciprocation, i. e. the stroke of the plunger 33, is determined by the position of the lower terminal of the pitman 41 with regard to the slot 23, so that by adjusting the lower end of said pitman along the slot 23, the length of the stroke of the plunger 33 may be regulated and controlled. In order to prevent the plunger 33 from dropping below the lower end of its cylinder 31 when the pitman 41 is being adjusted with regard to the crank 22, or under any other circumstances, a pin 42 is so positioned in the connecting rod 39 so that when the lower face of the plunger 33 is flush with the lower end of the cylinder 31, said pin will rest upon the upper horizontal frame piece 10″.

Each plate 30 is provided with a supply opening 43 adjoining the lower end of the cylinder 31 by means of which the ice cream is fed to the cylinder for measuring and transfer to the carton. This supply opening 43 can connect either directly with the freezer F, Fig. 1, or to a hopper designed to receive the ice cream from the freezer and it is to be understood that while a freezer is illustrated in conjunction with the supply opening or aperture 43, a hopper, not illustrated, may be used as readily.

In order to control the flow of ice cream from the freezer and also from the cylinder and to prevent wastage, a valve operates under the plate 30 to close the supply opening 43 when the contents of the cylinder 31 are discharged into the carton and to prevent the discharge of the cylinder when ice cream is being received through the supply opening 43. This valve constitutes a plate 44 having a pocket 45 in the upper face thereof nearer to the inner terminal thereof than to the outer terminal, thereby forming a cut-off block 46 adjacent to the outer terminal of said plate. This valve is mounted for reciprocation flush against the plate 30 so that when it is at its extreme outer limit of reciprocation, the pocket 45 thereof forms a means of communication between the cylinder 31 and the supply opening 43 whereby the ice cream from the freezer F, or a hopper, in case this is used, may readily pass therefrom through the supply opening 43, pocket 45 of the valve, into the cylinder 31. When the valve moves to its extreme inner end of its path of movement, the cut-off block 46 closes the supply opening 43 preventing the admission of any more ice cream from the freezer F or hopper, as the case may be, and, as will be seen hereinafter, establishes a means of discharge from the cylinder into the carton.

Below the valve 44 and to constitute a support as well as a means for taking wear therein, is a lower plate 47 co-extensive with the plate 30 and connected to the latter by means of the pins 48—49, pins 48 extending between the outer terminals of the plates 47 and 30 where they are fixed to the plate 30 and project below the outer surface of the plate 47 through which they loosely pass. On their projecting ends, these pins 48 are provided with nuts 48′ and springs 48″ which act against the nut 48′ for exerting a pressure on the outer surface of the plate 47. Pins 49 are embedded in and fixed to the lower plate 47 and pass through the upper plate 30 where they are provided with the nuts 49′ at their outer terminals and springs 49″ operating between the nuts 49′ and plate 30 to exert a pressure on the nuts to draw the plate 47 upwardly. In this manner, the plate 47 is held substantially flush against the valve 44 and is constantly drawn toward the latter and the plate 30 by action of the springs 48" and 49" for the purpose of taking up any wear which may occur by virtue of reciprocation of the valve 44. The tension of the springs 48"—49" may be regulated by the adjustment of the nuts 48' and 49' on the pins. The valve 44 operates against and between the pins 48 and 49, as indicated in Fig. 4, said pins acting as guides for the valve and are so situated with respect to each other and to the valve that they will always contact with the latter irrespective of its position during reciprocation, thereby maintaining a constant rectilinear movement by the valve.

The bottom of the pocket of the valve 44 is provided with a plurality of discharge slots 50, spaced one from the other and in parallel inter-relation, said slots 50 being so located with regard to the pocket 45 that when the valve is at the inner end of its reciprocatory movement, they will be aligned with the lower end of the cylinder 31, but when the valve is at the outer end of its movement, these slots will be out of complete alignment with the lower end of the cylinder 31. The lower plate 47 is provided with a number of slots 51 permanently aligned with the lower end of the cylinder 31 and flared somewhat at their bottoms, as at 52, said slots being provided for co-operation and registration with slots 50 in the valve 44 when the latter is at the inner end of its movement.

From the foregoing, it is manifest that when the valve is positioned, as in Fig. 3, to-wit: with the slots 50 and 51 out of registration and with the pocket 45 communicating with both the cylinder 31 and the supply opening 43, the ice cream has free means of admission from the freezer F, or hopper, as the case may be, to the cylinder, but has no means of discharge either from the cylinder or valve pocket 45. On the other hand, when the valve is moved inwardly until the slots 50 and 51 are in registration, the cut-off block 46 closes the supply opening 43 so that no more ice cream can be admitted to the cylinder 31. When the parts are thus positioned, the downward movement of the plunger 33, within the cylinder 31, forces the ice cream within the cylinder 31 out through the registering slots 50 and 51 in the valve 44 and plate 47 respectively, into the carton located below the plate 47. After the plunger has reached the lower end of the cylinder, the valve returns to the position illustrated in Fig. 3 and the plunger moves upwardly. Inasmuch as the plunger fits tightly in cylinder 31, the suction, created by its upward movement, combined with the gravity of the ice cream, in the hopper or freezer, supplies sufficient motive power to the ice cream to charge the cylinder. This charging of the cylinder may, if found necessary or desirable, also be assisted by a form feed within the hopper, not illustrated here, but which will be illustrated in a co-pending application or by the usual and standard blades of the freezer F. While the filling units are illustrated as being vertical, it will be understood that they can as well be positioned horizontally without any material change in the structure. The valve 44 is operated from the oscillating rod 25, heretofore described, which terminates adjoining the outer end of the path of movement of said valve where it is provided with an arm 53 which has a slot 54 in its outer end. The valve stem 55, centrally attached to the outer end of the valve, is obliquely bifurcated as at 56, the slot of said bifurcation being traversed by a bolt 57 having a wing nut 58 on its lower end (see Fig. 3). The slotted end of the arm 53 rests in the slot of the bifurcation 56 of the valve stem 55 where the bolt 57 passes through said slot 54 securing these two elements together. Hence, as the rod 25 oscillates, as heretofore described, upon the rotation of the operating shaft 16, the arm 53 will likewise oscillate, imparting a reciprocatory movement to the valve 44.

The cartons are fed through the machine below the plates 47 of the successive filling units in such a manner that the carton will stop at each filling unit, in accurate alignment with the slots 51 of the plate 47 of that unit, a sufficiently long period to receive the charge within the cylinder 31 after which it is fed to the next adjacent filling unit, and so on until each carton is filled and discharged at the opposite end of the machine. The conveyor for accomplishing this comprises a pair of angle bars 59 located below the plates 47 and resting adjoining the same, the angles of said bars facing one another so that the carton in passing through the machine has its upper side embraced between the bars 59 to prevent lateral movement. A plate 60 extends throughout the entire length of the machine below the bars 59 and parallel thereto. This plate 60 is supported by the hangers 61 which pass over the bars 59 and are secured to the downwardly extending flanges 60' formed on the longitudinal sides of the plate 60. At spaced intervals throughout the length of the plate 60 are mounted blocks 62, secured to said plate and supporting the angle irons 63 secured to the sides thereof. One web of each angle iron 63 rests vertically and is secured to the blocks 62, while the other web rests horizontally and extends outwardly from said blocks. These horizontal webs of the angle irons 63 occupy the same horizontal plane and in combination constitute a table upon which the cartons rest in passing through the machine. It will be seen, therefore, that the cartons at their bottoms rest upon the horizontal webs of the angle iron 63, while their upper sides are embraced in and between the angles of the angle bars 59.

For the purpose of transporting or sliding the cartons upon the table formed by the angle bars 63, a rack is mounted substantially co-planar with the upper faces of the block 62 and comprises a bar or rod 64 mounted for reciprocation on said blocks and provided at spaced intervals with yielding means for imparting progressive movement to the cartons. At regular spaced intervals, the bar 64 is provided with downwardly tapered slots 64$^a$ (see Fig. 7) extending completely therethrough and having a latch 65 mounted on the pin 67 extending transversely thereof. The rear end of this latch is heavier than its forward end, due to the fact that the forward end is cut away as at 66 or due, if desired, to the position of the pivot pin 67. Inasmuch as its rear end is the heavier, the latch 65 will normally assume the position illustrated in Fig. 3 with its forward end 65' projecting above the surface of the rack bar 64; the carton resting upon the bar 64 just in advance of the latch 65 is engaged by or rests against such normally projecting latch end 65'. Thus, when the bar 64 moves forwardly, in the direction of the arrow, Fig. 7, the carton will be moved simultaneously therewith; but when the bar 64 moves in a reverse direction, the latches will be moved away from the ends of the cartons engaged thereby and, upon contact with the next adjacent cartons to the rear, will be forced thereby into the slots 64$^a$ until they have passed under the cartons in question when they will reassume the positions shown in Fig. 7. As will be observed from Fig. 7, the tapered formation of the slot 64$^a$ limits the downward movement of the heavier end of the latch so that the portion of the latch projecting above the bar will be limited; while the pin 68 limits the downward movement of the latch when the same is forced into the slot by the cartons. During the reciprocation of the bar 64, it perhaps may be necessary for the latches 65 to wholly or partly pass the blocks 62 which support and guide said bars. In this event to prevent any premature withdrawal of the latches 65 into the slots 64$^a$, the upper surfaces of the blocks 62 are slotted as at 62$^a$ in alignment with the latches 65, whereby the latter may pass the blocks when required without having their positions altered.

This rack bar 64 constantly reciprocates and advances the cartons through the machine, the latches 65 engaging the same, the cartons resting stationary during any retrograde movement on the part of the bar 64. For the purpose of reciprocating this bar 64 under the filling units, a shaft 69 is mounted on the frame of the machine at the end thereof opposed to the drive shaft 13 (see Fig. 2) and pulley wheel 14 and has a crank 70 keyed to one end thereof which in turn is connected to a crank 71 on the central spur gear 17 of the operating shafts 16 by means of the pitman 72. Consequently, as the gear 17 of the central operating shaft 16 rotates, the crank 70, by virtue of its arrangement, will be given an oscillatory movement. This imparts a similar movement to a lever 73 keyed adjoining the opposite end of the shaft 69 to the crank 70, the upper end of the lever 73 being connected by a pitman 74 to a block 75 secured to the under side of the bar (see Fig. 1). The oscillatory movement of the lever 73 causes the rack bar 64 to reciprocate, as described, feeding the cartons through the machine in regular step-by-step or intermittent motion.

At the front end of the machine, to-wit: that adjoining the pulley wheel 14, is a table 76 from which the cartons are fed on to the rack bar 64 and the angle irons 63, the carton so fed being delivered to the table 77 at the opposite end of the machine.

Figure 6:
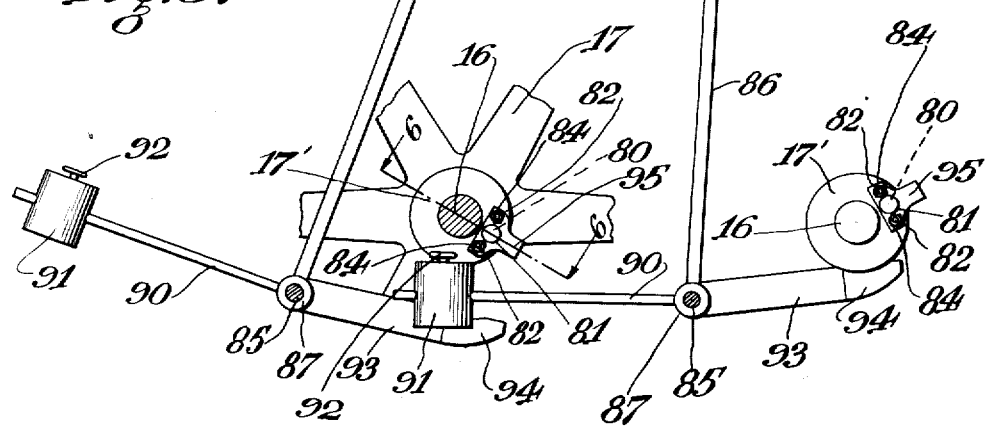
Fig. 6 is a vertical section taken along line 6—6 of Fig. 5 to disclose the clutch structure under control of the cartons by means of which the operation of the filling units is controlled.

In the event a carton should not be positioned under the plate 47 when the slots 50 and 51 of the valve 44 and the plate are in registration, the ice cream will be discharged through the slots upon the movement of the plunger 33, and wasted. To avoid such a contingency, the gears 17, while being continuously rotated, are mounted loosely upon their respective shafts 16 and only rotate to drive the operating shafts 16 upon a carton being properly positioned under the filling unit. To accomplish this rotation of the unit operating shaft 16, only when a carton is positioned to receive a charge from the co-operating filling unit, the end of the shaft 16 adjoining the gear 17 is provided with a clutch collar 78, keyed or otherwise secured thereto and operating flush against the outer face of the gear hub 17' (Figs. 2, 5 and 6). This clutch collar 78 is pierced by a transverse clutch pin socket 79 for co-operation with the clutch pin 80, reciprocatingly mounted in the gear hub 17'. A clutch plate 81 carries the pin 80 fixed thereto and is mounted on the guide pins 82 projecting from the gear hub 17' and passing through the terminals of the plate 81, where they are surrounded by the coil springs 83 between the terminal nuts 84 and the plate 81. The action of the coil springs 83, when they are free to act, is to force the plate 82 toward the hub 17' and hence project the clutch pin 80 from the opposite side of the hub 17' for entry into the socket 79 of the collar 78 when said socket registers with the openings in hub in which the pin 80 is mounted. When this occurs, the gear 17 is fixed to the shaft 16 so that the latter will rotate with said gear so long as the pin 80 remains in the socket 79.

The action of the springs 83 to connect the constantly rotating gear 17 to its unit operating shaft 16, is controlled from the cartons and for this purpose a control shaft 85 is mounted for oscillation between and in the bars 11 adjacent each unit operating shaft 16, and in vertical alignment with carton feed heretofore described, has an obliquely arranged control rod 86 fixed thereto by means of the collar 87. At its upper end the rod 86 terminates in the contact member 88 which is bent angularly at its end to create the extension 89 lying directly in the path of travel of the cartons C. In order to maintain the extension 89 in this position, i. e., in the path of movement of the cartons C, the collar 87 on the shaft 85, has a counter arm 90 secured thereto at approximately right angles to the control rod 86, upon which is slidably and adjustably mounted the counter weight 91, said weight being held in its adjusted position by a set screw 92 passing through the weight to impinge against the arm 90. It is manifest that the position of the counter weight 91 on the arm 90 determines not only the distance the extension 89 projects into the path of movement of the cartons C but also the ease with which the shaft 85 is oscillated. The cartons C in being advanced through the machine successively contact with the extensions 89 and as each carton is held against upward movement by the angle bars 59, it upon contact rides upon and forces the extension 89, the contact member 88 and the control rod 86 downwardly to the positions of these elements illustrated in Fig. 5 in connection with the carton C. This downward movement naturally lifts the counter arm 90 and weight 91 imparting a rotary movement to the shaft 85. When the carton C passes on out of contact with the extension 89, the weight 91 returns the elements to their normal positions and rotates the shaft in the reverse direction.

The oscillation of the shaft 85 under the control of the carton C determines the rotation of the shaft 16, in that the carton in moving the extension 89 downwardly, thus rotating the shaft 85 in one direction, makes it possible for the springs 83 to force the clutch pin 80 into the socket 79; and reversely, the release of the extension 89 by the carton C, and the consequent movement of the shaft 85 in the opposite direction, is responsible for the withdrawal of the clutch pin 80 from the socket 79 and the resulting cessation of movement by the shaft 16. This end is accomplished by the guide arm 93 secured on the terminal of the shaft 85 opposed to the collar 87, bent to have its free terminal 94 in alignment with the inner face of the hub 17' and clutch plate 81. For co-operation with this arm 93, the clutch plate has an outstanding cam teat 95, beveled or cammed, as at 96 on its inner face for contact with the tapered free terminal 94 of the guide arm 93. When the extension 89 is elevated and the arm 90 is down, that is when the elements are in their normal positions, the guide arm 93 is held up at its end 94 so that it holds the clutch plate 81 and pin 80 against the action of the springs 83, whenever, during the rotation of the gear 17, the pin 80 is aligned with socket 79, by causing the cammed or beveled surface 96 of the teat 95 to ride upon the tapered end 94 of the arm. On the other hand, the carton C in riding upon the extension 89, and moving the co-operating elements as heretofore described, swings the arm 93 downwardly so that its end 94 is out of the path of the teat 95 and hence the springs 83 are free to force the pin 80 into the socket 79 connecting the shaft 16 to the gear 17 thereby rotating the shaft. Hence, it is clear that before a shaft 16 may rotate to operate its filling unit, it is essential that a carton be positioned to receive the contents of the cylinder 31 to be discharged when such shaft 16 rotates.

From the foregoing, it will be manifest that the cartons C are fed through the machine by the bar 64 from the table 76 to the table 77 in predetermined relative positions and by a step-by-step, intermittent regular movement, the cartons stopping successively under the filling units. As each carton stops under one of the filling units, it acts upon the extension 89 to connect the constantly rotating gear 17 to its operating shaft 16 upon which said gear is normally loosely mounted whereby the shaft 16 is caused to rotate. The rotation of the shaft 16 causes the downward movement of the plunger 33 resulting in the discharge of a layer of ice cream into the carton. When this discharge is completed, the continued rotation of the shaft returns the valve 44 to the position shown in Fig. 3 and a new charge of ice cream is taken into the cylinder 31. The carton then passes on to the next filling unit and the rotation of the shaft 16 ceases. It is, of course, to be understood that the operations of all the parts heretofore described are co-ordinated and timed that the movements are fully controlled and regulated to maintain a maximum efficiency.

What is claimed is:—

1. The combination with an upper plate having a supply opening and a cylinder opening therein, of a cylinder mounted in said cylinder opening, a plunger mounted for reciprocation in said cylinder, a lower plate disposed parallel to said upper plate and having discharge openings therein, pins interposed between and operating through said plates, means mounted on said pins for forcing said plates toward one another, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, a valve stem fixed to said valve, having an oblique slot therein, an oscillatory rod for operating said valve, and an arm secured to the rod aforesaid and in the oblique slot of the valve stem.

2. The combination with an upper plate having a supply opening and a cylinder opening therein, of a cylinder mounted in said cylinder opening, a plunger mounted for reciprocation in said cylinder, a lower plate disposed parallel to said upper plate and having discharge openings therein, means for resiliently holding said plates together, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, a valve stem fixed to said valve, having an oblique slot therein, an oscillatory rod for operating said valve, and an arm secured to the rod aforesaid and in the oblique slot of the valve stem.

3. The combination with an upper plate having a supply opening and a cylinder opening therein, of a cylinder mounted in said cylinder opening, a plunger mounted for reciprocation in said cylinder, a lower plate disposed parallel to said upper plate and having discharge openings therein, pins interposed between and operating through said plates, means mounted on said pins for forcing said plates toward one another, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, and means for oscillating said valve.

4. The combination with an upper plate having a supply opening and a cylinder opening therein, of a cylinder mounted in said cylinder opening, a plunger mounted for reciprocation in said cylinder, a lower plate disposed parallel to said upper plate and having discharge openings therein, pins interposed between and operating through said plates, means mounted on said pins for forcing said plates toward one another, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, a carton conveyor for positioning cartons below the discharge openings in said lower plate, and means for reciprocating said valve.

5. The combination with an upper plate having a supply opening and a cylinder opening therein, of a cylinder mounted in said cylinder opening, a plunger mounted for reciprocation in said cylinder, a lower plate disposed parallel to said upper plate and having discharge openings therein, pins interposed between and operating through said plates, means mounted on said pins for forcing said plates toward one another, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, a carton conveyor for positioning cartons below the discharge openings in said lower plate, and means for reciprocating said valve when a carton is positioned below the discharge openings as aforesaid.

6. The combination with an upper plate having a supply opening and a cylinder opening therein, of a cylinder mounted in said cylinder opening, a plunger mounted for reciprocation in said cylinder, a lower plate having discharge openings therein, a valve mounted for reciprocation between said plates for alternately connecting said cylinder with said supply opening and said discharge openings and sealing said supply opening when said cylinder is connected with the discharge openings, a conveyor for positioning containers below said discharge openings, and means for reciprocating said valve.

7. The combination with an upper plate having a supply opening and a cylinder opening therein, of a cylinder mounted in said cylinder opening, a plunger mounted for reciprocation in said cylinder, a lower plate disposed parallel to said upper plate and having discharge openings therein, pins interposed between and operating through said plates, means mounted on said pins for forcing said plates toward one another, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, a carton conveyor for positioning cartons below the discharge openings in said lower plate, means for reciprocating said valve, and means co-operating therewith for reciprocating said plunger.

8. The combination with an upper plate having a supply opening and a cylinder opening therein, of a cylinder mounted in said cylinder opening, a plunger mounted in said cylinder opening, a plunger mounted for reciprocation in said cylinder, a lower plate disposed parallel to said upper plate and having discharge openings therein, pins interposed between and operating through said plates, means mounted on said pins for forcing said plates toward one another, a valve mounted for reciprocation between said plates having a pocket therein with discharge openings in the bottom and a block at one end thereof, the valve at one end of its path of movement being positioned with the discharge openings thereof in registration with the discharge openings of the lower plate and the block sealing the supply opening in the upper plate and at the opposite end of its path of movement being positioned with the discharge openings thereof out of registration with the like openings of the lower plate and the pocket thereof connecting the aforesaid supply opening with said cylinder, a carton conveyor for positioning cartons below the discharge openings in said lower plate, means for reciprocating said valve, and means co-operating therewith and controlled by the carton for reciprocating said plunger when a carton is positioned below said discharge openings as aforesaid.

9. A machine of the class described including a carrier for advancing containers step by step through the machine; a series of filling units spaced according to said steps, to which each container is moved in succession to be filled in part at each unit, each unit comprising a fixed cylinder, a piston movable therein and valve means for connecting the cylinder for loading upon one movement of the piston and for discharging upon the opposite movement of said piston; means for operating said units by actuating said pistons and valve means, one operating means being provided for each piston and valve means; and means under the control of the containers for controlling said operating means, one such control means being provided for each operating means and being responsive to the positioning of a container at the corresponding filling unit to set the operating means of that unit into operation.

10. A machine of the class described including a carrier for advancing containers step by step through the machine; a series of filling units spaced according to said steps, to which each container is moved in succession to be filled in part at each unit, each unit comprising a fixed cylinder, a piston movable therein and valve means for connecting the cylinder for loading upon one movement of the piston and for discharging upon the opposite movement of said piston; an operating shaft for each unit; means for operating each unit from its shaft, when active, by actuating the piston and valve means of that unit; and means actuated by the containers to render each said shaft active.

11. A machine of the class described, including a carrier for advancing containers step by step through the machine, a series of filling units spaced according to said steps, to which each container is moved in succession to be filled in part at each unit, each unit comprising a fixed cylinder, a piston movable therein and valve means for providing supply and discharge connections for the cylinder; an operating shaft for each unit; connections for putting each unit through one complete container filling operation for each rotation of said shaft; clutch means operative when started to connect said connections to said shaft for one rotation only of the latter; and means actuated by a container positioned at each unit to start the clutch means corresponding to that unit.

JULIUS JOHN MOJONNIER.
HARLEY RAY PHILLIPS.
LEWIS W. WARREN,
*Administrator, estate Henri B. Warren, deceased.*

Certificate of Correction.

It is hereby certified that in Letters Patent No. 1,502,110, granted July 22, 1924, upon the application of Julius John Mojonnier and Harley R. Phillips, of Oak Park, and Lewis W. Warren, of Oak Park, administrator of Henri B. Warren, deceased, late of Oak Park, Illinois, assignors to Mojonnier Bros. Co., of Chicago, Illinois, a Corporation of Illinois, for an improvement in " Ice-Cream-Bricking Machines," errors appear in the printed specification requiring correction as follows: Page 4, line 68, for the word " form " read *worm;* page 8, lines 52 and 53, claim 8, strike out the words and comma " a plunger mounted in said cylinder opening,"; and that the said Letters Patent should be read with these corrections therein that the same may conform to the record of the case in the Patent Office.

Signed and sealed this 2d day of September, A. D. 1924.

[SEAL.]
KARL FENNING,
*Acting Commissioner of Patents.*